Jan. 29, 1957  E. H. ENSINGER  2,779,508
HOPPER CONVEYOR
Filed Dec. 2, 1953  3 Sheets-Sheet 2
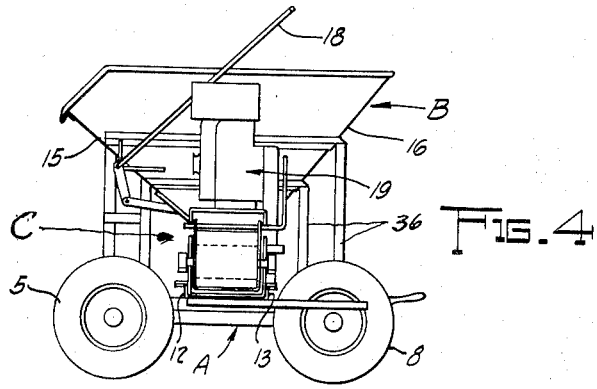
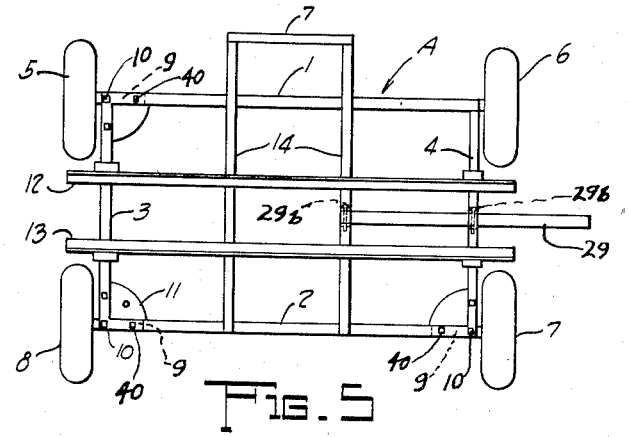
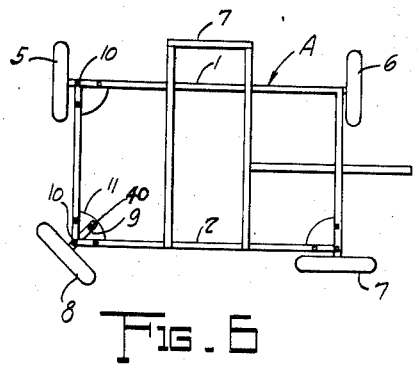
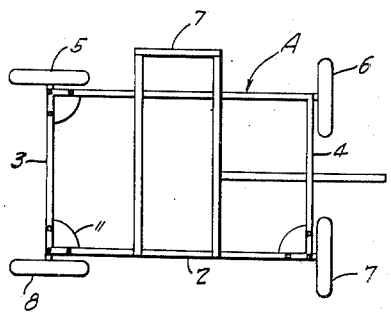
INVENTOR.
Earl H. Ensinger
BY Robert Robb
Attorneys.

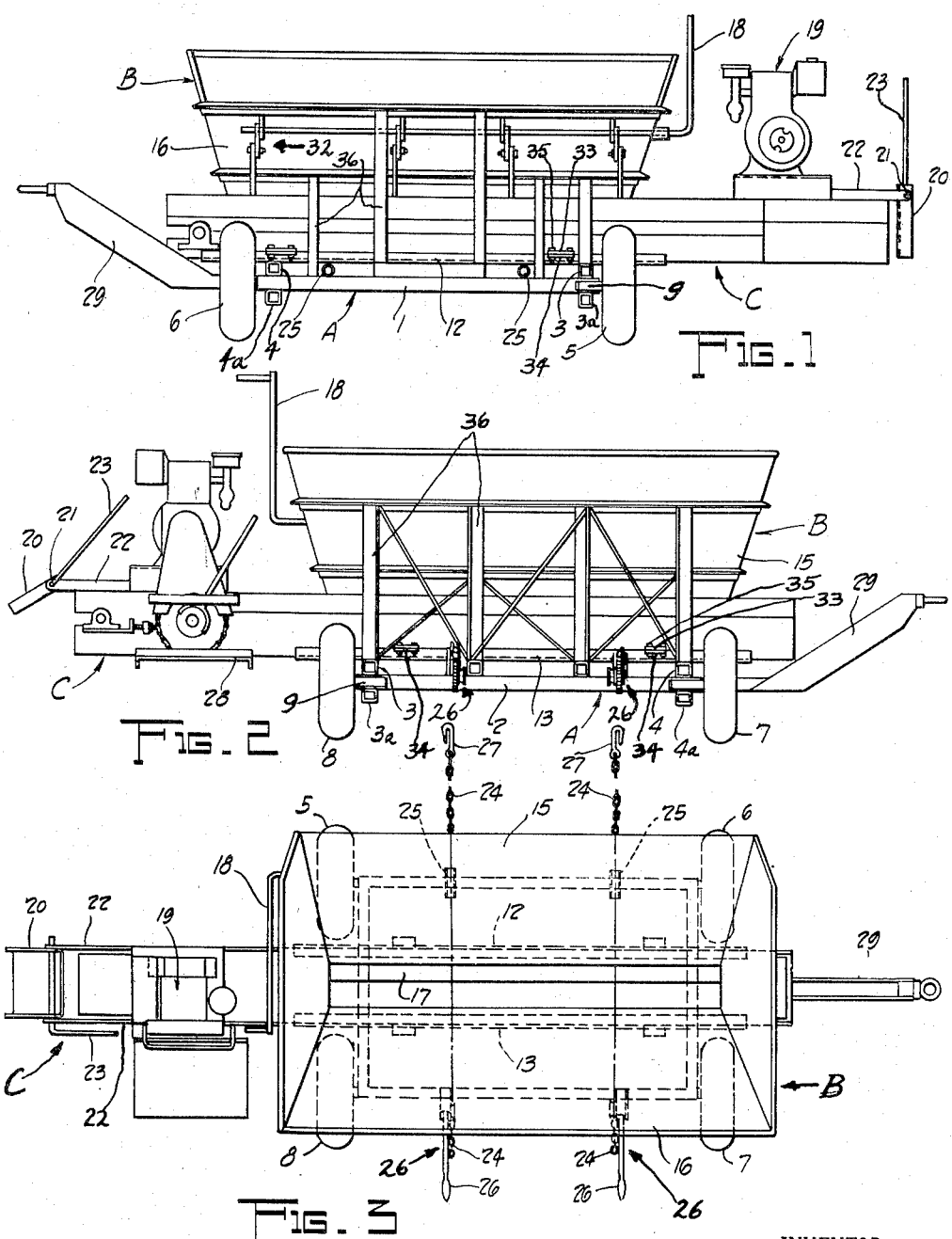

Jan. 29, 1957 E. H. ENSINGER 2,779,508
HOPPER CONVEYOR
Filed Dec. 2, 1953 3 Sheets-Sheet 3
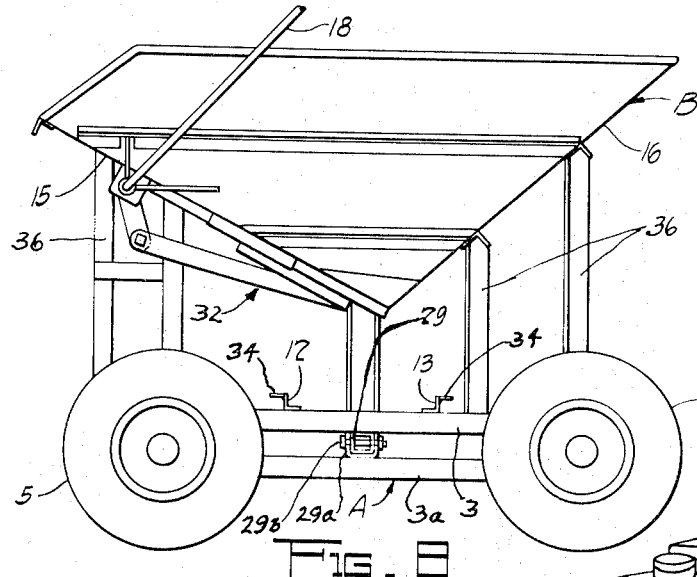
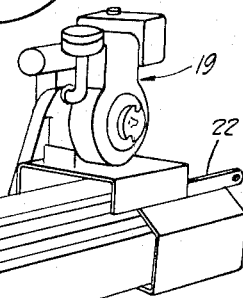
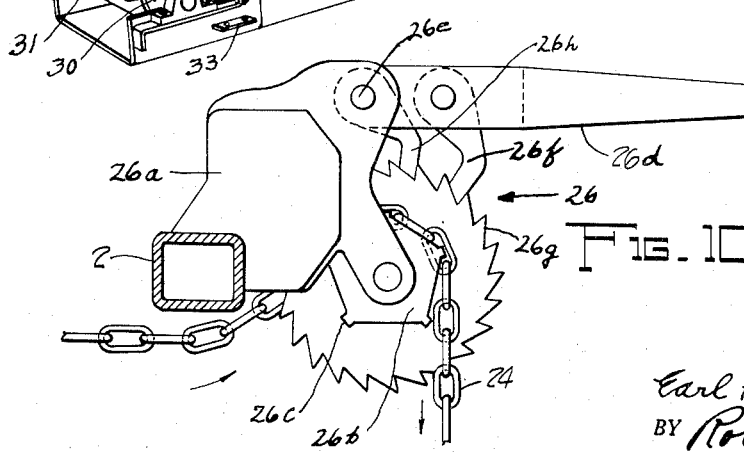
INVENTOR.
Earl H. Ensinger
BY Robb & Robb
Attorneys

United States Patent Office 2,779,508
Patented Jan. 29, 1957

2,779,508

HOPPER CONVEYOR

Earl H. Ensinger, Cleveland, Ohio

Application December 2, 1953, Serial No. 395,712

6 Claims. (Cl. 222—178)

My present invention comprises a novel combination hopper and conveyor device designed especially for use as a vehicle to be towed behind a truck or like towing vehicle and arranged to enable loose material to be fed from the hopper to the conveyor for distribution by the latter.

One of the principal objects of my invention is to provide such a combination hopper and conveyor device comprising a hopper unit and a detachable conveyor unit whereby the said units may be used in combination for distribution by the conveyor unit of materials fed thereto from the hopper, and whereby when the conveyor unit is detached, both the latter unit and the hopper unit may be separately used to perform their individual functions.

Another principal object of the invention is to provide a vehicle of the type referred to having novel wheel supporting means which are adjustable to enable the vehicle to be moved or towed in either a longitudinal direction or a transverse direction while the wheels are in engagement with the traction surface.

A further object of the invention is to provide a vehicle of the type referred to having novel wheel supporting means capable of adjustment for movement of the vehicle in either transverse or longitudinal directions, or for turning movement of the vehicle, while the wheels are in engagement with the traction surface.

Another object of the invention is to provide a trailer vehicle of the type referred to having novel means for detachable connection of the same with a towing vehicle whereby the trailer vehicle may be arranged in directly abutting relation with the towing vehicle and connected thereto for towing thereby without the necessity for manipulation of any connection means positioned between the rear extremity of the towing vehicle and the forward extremity of the trailer vehicle, whereby risk of injury to a person making the towing connection is minimized.

A further object of the invention is to provide a conveyor with adjustable deflector means designed to enable adjustment of and control of the direction of flow of material being distributed by the conveyor.

In carrying my invention into practice I provide a wheel supported trailer vehicle comprising a hopper unit and a conveyor unit detachably associated therewith in such a manner as to receive, when so associated, materials fed thereto from the hopper for conveying and distribution by the conveyor of materials so fed thereto. In the embodiment of my invention herein disclosed, the conveyor unit is provided with independent power means for operation of the conveyor belt, the conveyor unit being a self contained self powered unit capable of use independently of the hopper unit when the units are disassociated.

Also in the embodiment of my invention herein disclosed the hopper unit is a wheel supported trailing vehicle capable of use independently of the conveyor unit, as for example for the controlled feeding of materials from the hopper thereof either while the hopper unit is being towed or otherwise moved, or while the hopper unit is stationary.

The wheeled vehicle herein disclosed is provided with a plurality of wheel units which are individually swivelly adjustable around vertical axes for variously positioning the wheels for either longitudinal or transverse traction movement of the vehicle or for turning movement thereof.

The device of my invention herein disclosed is provided with a detachable tow bar adapted particularly for use when the vehicle is being towed in one direction and I also provide separate novel towing connection means comprising flexible linkages which may be in the form of chains or cables and provided at one extremity with hook means which may be hooked on to the front bumper or some other portion of the towing vehicle, the trailer vehicle being provided with adjusting means for adjusting the effective lengths of the flexible linkages.

The conveyor unit is provided with a flow control deflector means at the discharge end of the conveyor whereby the direction of flow of the material carried by the conveyor belt may be readily controlled.

Other objects, advantages, and features of novelty will become apparent from the following detailed description taken in conjunction with the accompanying drawings in which:

Figure 1 is a side elevation of the combination hopper and conveyor device, this side being the front of the device having reference to the direction of travel when the same is being towed behind the towing vehicle in operative condition for distributing material.

Figure 2 is a side elevation looking toward the opposite side of the device from that depicted in Figure 1.

Figure 3 is a top plan view of the same.

Figure 4 is an end elevation of the same looking toward the right hand end of Figure 1.

Figure 5 is a top plan view of the chassis and wheels of the device depicted in Figures 1 to 4 inclusive, Figure 5 showing the wheels adjusted for travel movement of the device as when being towed behind a towing vehicle under operative conditions for distributing material.

Figure 6 is a view similar to Figure 5 but showing the wheels differently adjusted for turning movement of the vehicle or device.

Figure 7 is a view similar to Figure 5 but showing the wheels still differently adjusted for towing of the vehicle or device for transporting the same from place to place when it is not being used for its operative function of distributing materials.

Figure 8 is a view similar to Figure 4 but with the conveyor unit removed.

Figure 9 is a perspective view of the conveyor unit alone, the deflector having been removed.

Figure 10 is an enlarged detail view of the adjusting means for adjusting the flexible linkage instrumentality of the towing means.

Now referring to the drawings and describing the invention in detail, the letter A generally designates the wheel supported chassis or bed frame of the combination vehicle or device comprising side frame members 1 and 2 rigidly connected to vertically spaced pairs of upper and lower end frame members 3, 3a and 4, 4a (see Figures 1, 2, and 5) to form a rectangular bed frame which also may include suitable cross frame members 14 supported upon and rigidly secured to the frame members 1 and 2. The frame members 1, 2, 3, 3a, and 4, 4a preferably comprise hollow tubular members of square cross section which may be formed of steel of angular shape.

The chassis A is supported upon traction wheels designated 5, 6, 7, and 8. Each of these wheels is rotatably mounted on a suitable spindle suitably fixed to a respective spindle extension 9 which may be of square cross section, the same being swivelly mounted at respective corners of the rectangular bed frame above mentioned by means of respective vertical pivots 10, the spindle extensions 9 being alignable with and receivable within adjacent portions of the side frame members 1 and 2, portions of the frame members 1 and 2 being cut away adjacent the ends thereof so as to permit such movement of the spindle extensions into alignment therewith. The spindle extensions 9 are also swingable about their respective vertical pivots 10 into alignment with, and between, the upper and lower frame members 3, 3a or 4, 4a. The spindle extensions 9 are provided with vertical openings therethrough alignable with similar vertical openings through the frame members 1, 2, 3, 3a, 4 and 4a whereby the respective wheel spindle extensions 9 may be locked either in a position aligned with a respective frame member 1 or 2, or in a position aligned with the frame members 3, 3a or 4, 4a by inserting a bolt 40 through the aligned openings in the frame members and the spindle extensions 9.

For positioning one of the wheels in an intermediate position such as that shown in Figure 6 with reference to wheel 8, the spindle extension 9 of such wheel may be locked in such intermediate position by the provision of a sector plate 11 fixed to one of the end frame members and to the adjacent side frame member below the travel of the spindle extension 9 when swivelled around its respective vertical pivot 10, said sector plate being provided with a vertical opening therethrough at a position intermediate the respective side and end frame members whereby when the opening in the spindle extension 9 is aligned with the openings in the sector plate 11 and the locking bolt 40 inserted through said openings, the spindle extension 9 will be locked in such intermediate position.

It will be apparent from observation of Figures 5, 6, and 7 that the wheels may be adjusted to different positions as shown in those figures, by the means just above described.

The combination hopper and conveyor machine or device of my invention includes a suitable hopper unit generally designated by the letter B suitably mounted upon and secured to the chassis or bed frame designated A, and the said combination machine or device of my invention also includes a conveyor unit generally designated by the letter C and which is detachably mounted upon the chassis A. For the latter purpose the chassis A is provided with a pair of parallel guide rails 12 and 13 superposed upon and supported by the end frame members 3 and 4 and the cross frame members 14. The rail members 12 and 13 are in the form of angle members having vertical side portions which confine the movement of the conveyor C therebetween whereby the conveyor C may be slid into position supported upon the guide rails 12 and 13 or slid off said rails for removing the conveyor unit C from the remainder of the machine or device.

The hopper unit B may be of a more or less conventional form as shown having the sloping front and rear side portions 15 and 16 which converge toward one another at their lower ends providing a relatively narrow bottom opening for the hopper structure which may be controlled for closing and opening by a conventional type of sliding gate 17 operable for opening and closing movement by means of a suitable manually operable lever 18 and conventional linkage as partly shown at 32, Figure 1.

The conveyor unit C may be of a conventional form comprising a bottom and side frame portions of generally U-shape in transverse cross section within which is provided an endless belt extending longitudinally of the conveyor unit and passing over drums or rollers 30 at opposite ends thereof and suitably supported intermediate its ends. The conveyor unit is provided with its own self contained source of power which may be a suitable internal combustion engine generally indicated by the numeral 19 operatively connected for driving one of the rollers over which the conveyor belt passes by suitable means which need not be explained in detail for the purposes hereof, since the details of the conveyor unit per se do not form any part of this invention, with the exception of the discharge controlling deflector means to be hereinafter described. With regard to the conveyor unit C per se, it is sufficient for the purposes hereof to state that the same is provided with a suitable endless conveyor belt 31 which is suitably driven by means of the engine 19 shown and that material received by the conveyor belt is moved thereby in a direction from left to right thereof referring to Figure 1. It is to be noted also that the conveyor unit C when mounted upon the guide rails 12 and 13 in its operative position in conjunction with the combination machine or device of my invention is so positioned that the lower ends of the sloping sides 15 and 16 of the hopper unit B converge within the vertical planes of the side frame members of the conveyor unit C whereby material fed by gravity from the hopper through the bottom opening thereof will be deposited upon the endless belt of the conveyor unit C for movement thereby from left to right having reference to Figure 1 for discharge outwardly at the extreme right or discharge end of the conveyor unit C, having reference to Figure 1. At said discharge end of the conveyor unit C there is provided a suitable controllable material flow deflector means, which as seen best in Figures 1, 2, and 4 may comprise a flat deflector plate 20 which is pivoted for movement about a horizontal axis 21 between arms 22 fixed to the upper portion of the frame members of the conveyor unit. This deflector plate 20 is operably connected to a suitable lever 23 which is operable to swing the deflector plate 20 about the horizontal axis 21, the deflector plate 20 being arranged so that when it is positioned in vertical position as shown in Figure 1 it extends across the discharge end of the conveyor directly in the path of flow of material discharged therefrom. By suitable manipulation of the lever 23 the operator can direct the flow of material discharged from the conveyor in the manner desired.

Any suitable means may be provided for retaining the conveyor unit C in its operative position as a part of the combination machine as shown in Figures 1 to 4, and for this purpose I provide alignable bolting plates 22 on the frame of the conveyor unit C and 34 on the frame of the chassis A through which bolts 35 may be passed for locking the conveyor unit C in such operative condition.

The combination hopper and conveyor device or machine herein described is adapted to be used for distributing material such as sand or gravel or the like while being towed behind a truck or other vehicle. For such purposes it is often desirable to tow the combination machine of my invention behind a dump truck, the dump body of which may carry a quantity of the sand, gravel or other material to be distributed, which material will be discharged from the dump body into the hopper of the hopper unit of my said machine. Under such conditions it is desirable that the combination machine of my invention is to be connected to the towing truck with the frame of my combination machine abutting against the rear of the truck so that the raising of the dump body of the towing truck will enable discharge of the contents of the dump body directly into the hopper of my combination machine. In connecting the machine in this manner in abutting relation with the rear end of the towing truck by the use of conventional forms of towing connections whereby the connection would be effected at the rear of the truck necessitating that the person effecting such connection stand between the towing truck and the hopper conveyor trailer vehicle or necessitating that he reach between those vehicles in effecting the towing connection involves danger of injury to such person should the truck back up to the trailer vehicle while the person who is going to effect the towing connection is standing or reaching therebetween. For the purposes of avoiding such risk of injury I provide novel towing connection means which do not require the making of the connection at the rear end of the towing vehicle.

The novel towing connection means of my invention, just referred to, comprise flexible linkage devices which may be in the form of cables, or chains as shown, the same being designated by the numeral 24 and two of the same being used for purposes of illustration in Figure 3. Each of these flexible linkage devices, such as the chains 24, go through a respective guide tube 25 fixed to the chassis A and arranged so that the chains 24 extend in the direction of travel of the vehicle and are spaced transversely from one another with reference to said direction of travel. One end of each of the chains 24 is connected to a suitable adjusting device carried by the trailer vehicle. These adjusting devices may comprise ratchet instrumentalities as shown herein for purposes of illustration and generally designated by the numeral 26. Each of these ratchet devices may comprise a suitable mounting plate 26a secured to the chassis A and on which is suitably mounted a chain engaging rotatable member such as gear 26b having teeth 26c engaging between the chain links, and a respective lever 26d pivoted at 26e and provided with a pushing pawl 26f pivoted to lever 26d for engaging the ratchet teeth 26g on the gear 26b. The hitch ends of the chains 24 may be provided with suitable hitch effecting means which as herein illustrated may comprise the hook members 27. Oscillating movement of lever 26d serves to effect pushing engagement of pawl 26f with successive ratchet teeth 26g for rotation of gear 26b causing movement of chain 24 thereover, thus adjusting the effective length thereof by shortening the distance between hook 27 and gear 26b. A holding pawl 26h pivoted at 26e is provided for engaging ratchet teeth 26g to hold the gear 26b against reverse movement while lever 26d is being moved to position the pushing pawl 26f for engagement with the next ratchet tooth.

For the purposes of effecting towing connection by the means just described, the chains are pulled out (after release of members 26b from engagement with holding pawl 26h) so that they extend from the trailer vehicle a greater distance than the length of the towing truck or the towing vehicle and the chains or flexible linkage instrumentalities 24 are then laid on the ground in parallel relation in the direction of travel. The truck or other towing vehicle then backs up into abutment with the trailer vehicle in such a manner that the chains lie between the wheels of the towing vehicle in the direction of travel. When the truck is backed into abutting relation with the trailer vehicle the hook members 27 may then be hooked over the front bumper of the truck or other towing vehicle whereafter the chains are drawn taut by rotating members 26b by operation of levers 26d thereby adjusting the effective lengths of the chains to shorten the same and thus holding the trailer vehicle in towing relation to the towing vehicle.

The manner of use and operation of the combination hopper and conveyor machine of my invention will be largely understood from the foregoing description. It may be noted however that when the combination machine of my invention is to be used for distribution of materials fed from the hopper to the conveyor for discharge by the latter, the wheels 5, 6, 7, and 8 will be positioned and locked in the positions shown in Figure 5, it being further understood that the towing vehicle will be backed up into engagement with the front of the combination machine, or that side thereof as viewed in Figure 1 which may be designated as the front thereof when the machine is to be used as just indicated. Now it will be apparent also that when the combination machine of my invention is being towed by a dump truck with the front side of the machine as viewed in Figure 1 abutting the rear of said dump truck, and the engine 19 of the conveyor unit C operating the conveyor belt, material such as sand or gravel carried in the dump body of the truck may be continuously discharged into the hopper of the hopper unit B and is discharged therefrom as controlled by the operation of the sliding gate through the lever 18 so as to control the amount of material deposited upon the belt of the conveyor unit C. The material deposited upon the conveyor belt C will be discharged from the right end of the conveyor unit C, referring to Figure 1 as the machine is moving along in towed relation behind the truck and the discharge of the material from the conveyor unit C will be under the control of the operator who may stand upon a platform 28, see Figure 2, suitably supported upon the frame of the conveyor unit C, from which station the operator can readily manipulate the discharge gate of the hopper unit B by operation of the lever 18 and he may also readily direct the flow of material discharged from the discharge end of the conveyor unit C by operating the lever 23 of the deflector means 20 to control the direction and distance of discharge flow of the material being discharged by the conveyor.

The machine in my invention is particularly useful for the filling of trenches along the side of a road in which sewer pipe may have been laid and over which loose material such as sand or gravel must be used to fill the trenches and a quantity of which material may conveniently be carried in a dump truck. By manipulation of the deflector 20 the operator may control the direction of and distance to which the material will flow in being discharged from the conveyor.

It will be apparent also that the conveyor unit C may be readily disconnected and removed from the remainder of the machine for use separately therefrom.

It will be also apparent that the machine will be useful as a trailing hopper vehicle when the conveyor unit C is dis-associated therefrom. Under such conditions, for example, the machine in the condition of Figure 8 can be towed behind a truck for distributing material from a truck into the hopper of the hopper unit B and thence discharged in a controlled manner upon a roadway or the like as the vehicles are moving thereover, through the operator's control of the discharge from the hopper by means of the sliding gate and control lever 18.

When the machine of my invention is not connected to a towing vehicle, it will be of course supported by the traction wheels 5, 6, 7, and 8 and under such condition the machine may be moved and will be desirably positioned preliminary to connection with a towing vehicle, by manual power. In this connection Figure 6 shows the manner in which the wheels may be positioned for circular turning movement of the machine by manual power. As machines of this nature are very heavy, the novel provision for differently positioning the wheels is very advantageous for this purpose.

Figure 7 shows the positioning of the wheels of the machine when it is desired to tow the machine from one location to another when it is not being operatively used for its intended function. Under such conditions the machine is towed by means of the tongue 29 suitably attached to the rear of the towing vehicle in such a manner as to raise one end of the machine and the wheels 6 and 7 from the ground, the machine being supported in towed relation only by the wheels 5 and 8 and the towing connection.

The tongue 29 at its inner end is received between spaced brackets or channel sides 29a secured to one of the cross-frame members 14, said brackets and tongue being provided with alinable openings therethrough for receiving a bolt 29b for detachably connecting the tongue 29 to the chassis A. A similar pair of spaced brackets or channel sides secured to and between frame members 4 and 4a and having openings therethrough alinable with another opening through tongue 29 receives a bolt for detachable connection of the tongue 29 to chassis A.

It will be understood that hopper 15 is suitably supported on the chassis A by means of suitable brace members 36 suitably secured to the hopper and to the bed frame of the chassis.

I claim:

1. In a vehicle unit of the class described in combination, a vehicle frame, wheels supporting said frame, a hopper on said frame, said hopper having a relatively long narrow opening from which material may be distributed, certain of the wheels being bodily swingably connected to the frame for movement into positions to support the unit for movement with the opening transversely of the surface over which the said unit is traveling for material flow therethrough and to support the unit with the opening lying at right angles thereto when said unit is being transported, and a conveyor unit on the frame having a receiving opening registering with said hopper opening to receive material from said opening, said conveyor unit extending beyond the hopper and being operative to transport away from said hopper and discharge at its outer end, material received from the hopper.

2. A combination hopper and conveyor machine of the class described, comprising, in combination, a wheel supported chassis unit, a hopper unit mounted on said chassis unit and comprising a hopper elongate in a direction transverse to its travel when distributing material and having a bottom opening elongate in the same direction adapted to distribute material transversely over a road subgrade while moving therealong, means on the chassis unit to support a conveyor unit, and a conveyor unit detachably and removably mounted on said chassis unit, said conveyor unit having a receiving inlet opening registering with the hopper opening and coextensive therewith, the conveyor extending beyond one end of said hopper and discharge means located at the outer end providing for discharge of material received thereby at said outer end, toward the side of the subgrade while the unit is traveling therealong.

3. A combination hopper and conveyor machine of the class described, comprising, in combination, a wheel supported chassis unit, a hopper unit mounted on said chassis unit and comprising a hopper having a bottom opening adapted to distribute material transversely over a road subgrade while moving therealong, means on the chassis unit to support a conveyor unit, and a conveyor unit detachably and removably mounted on said chassis unit, said conveyor unit having a receiving inlet opening registering with the hopper opening and coextensive therewith, the conveyor extending beyond one end of said hopper and providing for discharge of material received thereby at its outer end, toward the side of the subgrade while the unit is traveling therealong, and material flow control means at the discharge end of the conveyor unit for directing flow of the material carried by said conveyor instrumentality for discharge therefrom in a selected direction.

4. A combination hopper and conveyor machine of the class described, comprising, in combination, a wheel supported chassis unit, a hopper unit mounted on said chassis unit and comprising a hopper having a bottom opening adapted to distribute material transversely over a road subgrade while moving therealong, means on the chassis unit to support a conveyor unit, and a conveyor unit detachably and removably mounted on said chassis unit, said conveyor unit having a receiving inlet opening registering with the hopper opening and coextensive therewith, the conveyor extending beyond one end of said hopper and providing for discharge of material received thereby at its outer end, toward the side of the subgrade while the unit is traveling therealong, means for releasably retaining the conveyor unit arranged in the condition stated, and means to control the size of the inlet opening registering with said hopper opening and thus the quantity of material spread during movement of the chassis unit over a subgrade, said means being likewise operable to regulate the quantity of material received by the conveyor.

5. In a vehicle unit of the class described in combination, a vehicle frame, wheels supporting said frame, a hopper on said frame, said hopper having a relatively long narrow opening from which material may be distributed, certain of the wheels being bodily swingably connected to the frame for movement into positions to support the unit for movement with the opening transversely of the surface over which the said unit is traveling for material flow therethrough and to support the unit with the opening lying at right angles thereto when said unit is being transported, and a conveyor unit on the frame having a receiving opening registering with said hopper opening to receive material from said opening, said conveyor unit extending beyond the hopper and being operative to transport away from said hopper and discharge at its outer end material received from the hopper, and means for connecting the vehicle frame to a towing vehicle when the wheels are in the position first described, other means for such connection being provided for the vehicle frame when the wheels are in the last described position.

6. In a vehicle unit of the class described, in combination, a vehicle frame, wheels supporting said frame, a hopper on said frame, said hopper having a relatively long narrow opening from which material may be distributed, certain of the wheels being bodily swingably connected to the frame for movement into positions to support the unit for movement with the opening transversely of the surface over which the said unit is traveling for material flow therethrough and to support the unit with the opening lying at right angles thereto when said unit is being transported, and a conveyor unit on the frame having a receiving opening registering with said hopper opening to receive material from said opening, said conveyor unit extending beyond the hopper and being operative to transport away from said hopper and discharge at its outer end material received from the hopper, and means for connecting the vehicle frame to a towing vehicle for the distribution of material when the swingable wheels are in a position at right angles to the opening, and other means for connecting the vehicle frame to a towing vehicle when the wheels are generally parallel to the opening for transport.

References Cited in the file of this patent

UNITED STATES PATENTS

| Number | Name | Date |
|---|---|---|
| 219,911 | Clark et al. | Sept. 23, 1879 |
| 428,346 | Mueller | May 20, 1890 |
| 803,003 | Matthews | Oct. 31, 1905 |
| 931,054 | Gardner | Aug. 17, 1909 |
| 1,234,532 | Dickerson | July 24, 1917 |
| 1,300,419 | Langnes | Apr. 15, 1919 |
| 1,733,043 | Zelewski | Oct. 22, 1929 |
| 1,847,157 | Wilhelm | Mar. 1, 1932 |
| 2,091,505 | Griffith | Aug. 31, 1937 |
| 2,135,972 | Garlinger | Nov. 8, 1938 |
| 2,136,560 | Nichols | Nov. 15, 1938 |
| 2,150,010 | Solomon | Mar. 7, 1939 |
| 2,332,729 | Klosterman | Oct. 26, 1943 |
| 2,511,514 | Rosselot | June 13, 1950 |
| 2,647,756 | Allersma | Aug. 4, 1953 |

FOREIGN PATENTS

| 283,680 | Germany | Apr. 21, 1915 |